(12) United States Patent
Sausse et al.

(10) Patent No.: US 9,645,326 B1
(45) Date of Patent: May 9, 2017

(54) OPTICAL CONNECTOR WITH A MOVABLE CLEANING ELEMENT

(71) Applicant: HEWLETT PACKARD ENTERPRISE DEVELOPMENT LP, Houston, TX (US)

(72) Inventors: Brandy Dauenhauer Sausse, Houston, TX (US); John Norton, Houston, TX (US); Kevin Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/166,175

(22) Filed: May 26, 2016

(51) Int. Cl.
*G02B 6/38* (2006.01)

(52) U.S. Cl.
CPC ......... *G02B 6/3866* (2013.01); *G02B 6/3849* (2013.01); *G02B 6/3893* (2013.01)

(58) Field of Classification Search
CPC .............................. G02B 6/3866; B08B 1/006
See application file for complete search history.

(56) References Cited

U.S. PATENT DOCUMENTS

| | | | |
|---|---|---|---|
| 4,708,432 A | 11/1987 | Berg | |
| 6,675,425 B1 | 1/2004 | Timura | |
| 6,678,442 B2 | 1/2004 | Gall et al. | |
| 6,839,935 B2 | 1/2005 | Kiani et al. | |
| 6,986,607 B2 | 1/2006 | Roth et al. | |
| 8,393,802 B2 | 3/2013 | Stanley et al. | |
| 8,579,518 B2 * | 11/2013 | Isenhour | G02B 6/3825 385/55 |
| 8,727,636 B2 * | 5/2014 | Isenhour | G02B 6/3807 385/70 |
| 2004/0088813 A1 | 5/2004 | Cox | |
| 2015/0301288 A1 | 10/2015 | Thornton, Jr. | |

FOREIGN PATENT DOCUMENTS

GB    2300978    11/1996

* cited by examiner

*Primary Examiner* — Omar R Rojas
(74) *Attorney, Agent, or Firm* — Hewlett Packard Enterprise Patent Department

(57) ABSTRACT

Examples include an optical connector with a movable cleaning element that comprises a connector sleeve and an optical ferrule located at a rear of the connector sleeve. Some examples comprise a cleaning element located within the connector sleeve, said cleaning element comprising a wipe panel to clean an end of an optical ferrule of a male optical connector when mated with the female optical connector and a spring flap to couple the wipe panel to the connector sleeve. Some examples comprise channels, located in the connector sleeve, and protrusions, located in the wipe panel, that engage into the channels such that the wipe panel is movable along the channels between a cleaning position in which the wipe panel is positioned perpendicular to the optical ferrule of the male optical connector and a resting position in which the wipe panel allows connection of the ferrules of the male and female optical connectors.

20 Claims, 6 Drawing Sheets

OPTICAL CONNECTOR WITH A MOVABLE CLEANING ELEMENT

BACKGROUND

Many applications depend on sending and receiving relatively large amounts of data. Technologies based on transmitting data using light are important methods for high network bandwidth connectivity. There are a number of devices that use light for transmitting information. For example, optical fibers are capable of transmitting data over vast distances providing high network bandwidth. Optical transceivers integrate multiple photonic functions providing functionality for light signals.

Optical connectors may be used where a connect/disconnect capability is required in an optical communication system. Optical connectors may be used to, for example, connect any kind of optical equipment such as waveguides (e.g., optical fibers), or optical transceivers. For example, an optical connector may be used to interconnect optical fibers, or to connect an optical fiber to an optical transceiver. Optical connectors may be designed for temporary interconnection of optical equipment. However, existence of dirt, including dust particles, contaminants or similar, on the connection faces of the optical connectors may partially occlude the light going from one optical fiber to another, significantly reducing connection bandwidth.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
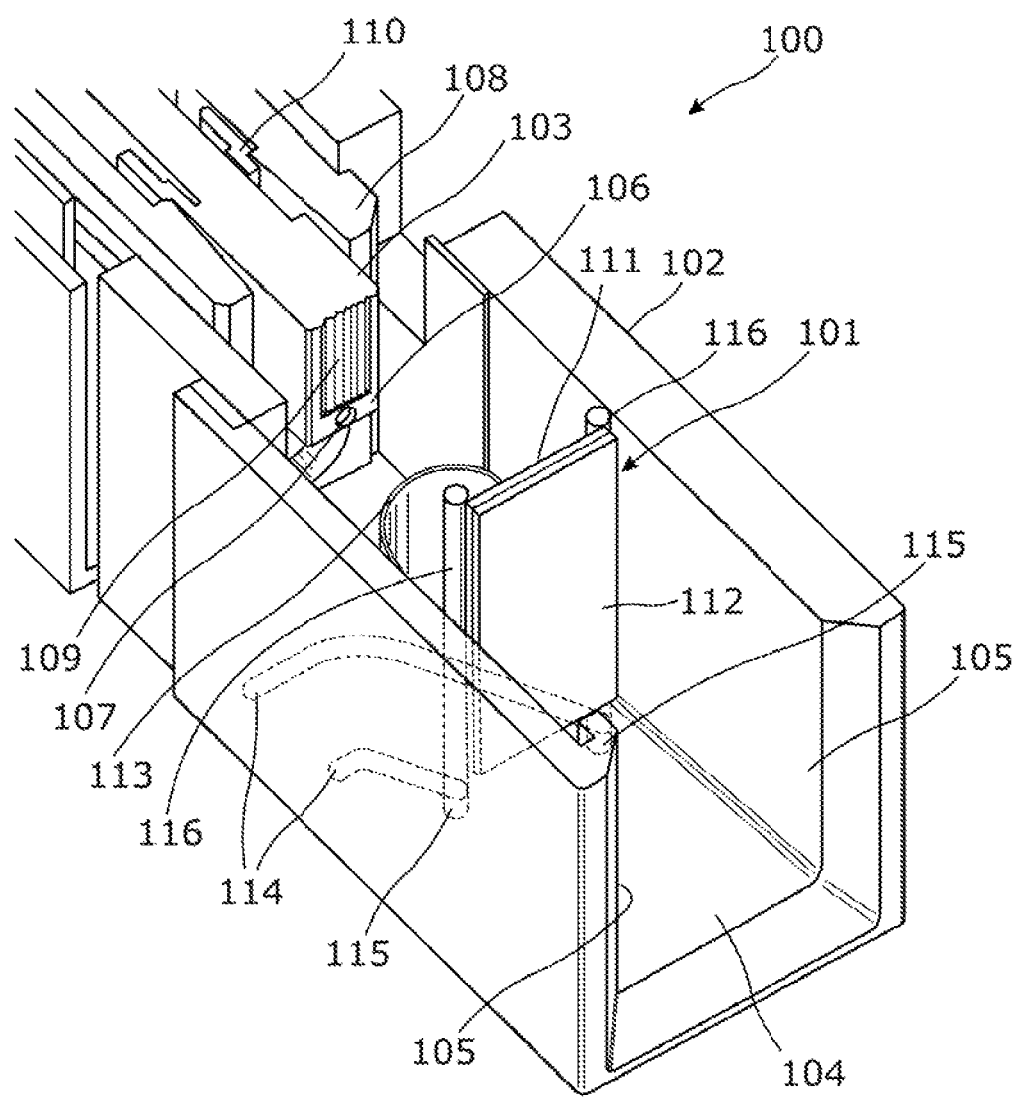
FIG. 1 illustrates a perspective view of an example optical connector with a movable cleaning element.

Optical fibers are widely used for data transmissions because of their wide bandwidth and capacity for carrying data in the form of light signals that are unaffected by electromagnetic fields. Currently, optical fibers are connected by using optical fiber connectors, also named as optical connectors or optical interfaces.

Dust particles can land on the mating surface of an optical connector that comes into direct contact with another optical connector, partially occluding the light going from one cable to another. Other common contaminants that may appear on the mating surface of the optical connector may be skin flakes, alcohol residue, machine oil, fabric fibers, etc. Common sources of contamination of the optical connectors are, for example, accidental contact with installer's fingers, cleaning solvent residues, hygroscopic liquids, etc.

Contamination may affect the light propagating between the optical fiber cores or disrupt uniform contact between mating surfaces of the optical connectors. It also interferes with back reflectance, also named optical return loss, of the connection. Liquid residues have different refractive indices than the optical fiber which affects data transmission. Besides, mating dirty optical connectors will cause cross contamination, i.e., a dirty mating surface of an optical connector will contaminate a clean mating surface of the other optical connector to which contacts, and hard contaminates will scratch and pit the mating end face of the optical connectors. All this, will worsen data transmission between the optical connectors reducing the available bandwidth.

The mating surface of an optical connector may correspond to the mating surface of the ferrule of the connector. Ferrules are elements within the optical connector, used to house, protect and align the optical fibers for optimum transmission of the optical signal.

Currently, the only way to clean the mating surfaces of the optical connectors is by hand by using either special tools with cleaners or a clean cloth to wipe away any dirt. However, cleanliness of the optical connector directly affects an optical signal loss at a joint where two complimentary optical connectors are mated. A conventional manner of cleaning the mating surface of the optical connectors is using a manual cleaning device. However, these solutions imply wiping the optical connector by moving the connector or the manual cleaning device repeatedly after manual alignment, which increases difficulty and decreases cleaning efficiency. In optical connectors with enclosures having the mating surface of the optical connector located at the rear of the enclosure, there may not be an easy way to clean the mating surface of the optical connectors without taking the system apart and cleaning by hand.

To address these issues, examples described herein may include an apparatus comprising a female optical connector that, in turn, comprises a connector sleeve, an optical ferrule located at a rear of the connector sleeve and a cleaning element located within the connector sleeve. The cleaning element may comprise a wipe panel to clean an end of an optical ferrule of a male optical connector when mated with the female optical connector and a spring flap to couple the wipe panel to the connector sleeve. The connector sleeve may further comprise channels and the wipe panel may comprise protrusions that engage into the channels such that the wipe panel is movable along the channels between a cleaning position, in which the wipe panel is positioned perpendicular to the optical ferrule of the male optical connector, and a resting position, in which the wipe panel is positioned to allow connection of the optical ferrules of the male and female optical connectors. The channels in the connector sleeve and the protrusions in the wipe panel guide the cleaning element when the male optical connector pushes the wipe panel out of the way, avoiding any blocking of the cleaning element during its movement from the resting position to the position in which the connection of the optical connectors is allowed, and vice versa. The blocking of the cleaning element could impede a proper connection of the optical connectors and could also damage any of the mating surfaces of the optical ferrules.

The following provides a detailed description of examples illustrated by FIGS. 1-7.

Referring now to the drawings, FIG. 1 shows a perspective view of an example of a female optical connector 100 with a movable cleaning element 101. More specifically, FIG. 1 shows a lower portion of the female optical connector 100, said lower portion corresponding to a longitudinal section of the female optical connector 100 along the upper surface of the shown optical connector 100. The optical connector 100 comprises a rectangular connector sleeve 102 having an opening, a bottom wall 104 and an opposite upper wall (not shown in the figure) and two opposite side walls 105. Other examples may comprise connector sleeves with different geometries depending on the specific use of the optical connector. The optical connector 100 further comprises an optical ferrule 103 located at the rear of the connector sleeve 102. The connector sleeve 102 protects the optical ferrule 103 and help to axially align the optical connectors so their corresponding optical ferrules are aligned within a specified tolerance to optimize data transmission. The optical ferrule 103 supports an end portion of at least one optical lens (not shown in the figure) and has a mating end face 106 at which an end 107 of the optical lens is located. When two optical connectors are interconnected, the mating end faces of the optical ferrules abut one another. With the optical connectors connected, their respective optical lenses are coaxially aligned such that the end faces of the end portions of the optical lenses directly oppose one another. In this way, an optical signal can be transmitted from optical lens to optical lens through the aligned end faces of the optical lenses. In this example, the mating end face 106 of the optical ferrule 103 comprises a shaped surface 109 that complimentarily matches to another shaped surface of the optical ferrule of a male optical connector to assure a proper alignment of the ends 107 of the end portions of the optical lenses. In other examples, optical ferrules of optical connectors may support end portions of more than one optical lens, such as an optical connector that may support 64 optical lenses.

The connector sleeve 102 is attached to the optical ferrule 103 by interposition of a sub-assembly body 108 to which the optical ferrule 103 is coupled. The sub-assembly 108 may comprise elements to hold the optical cable, where the at least one optical fiber is embedded, in place. The end of the optical ferrule 103 protrudes out of the sub-assembly body 108 to mate with another optical ferrule inside the connector sleeve 102. The optical ferrule 103 is attached to the sub-assembly body 108 by a click mechanism 110 or may be attached by means of any other element or mechanism able to assure a strong and lasting connection between both elements.

The movable cleaning element 101 comprises a wipe panel 111 having a contacting surface with the optical ferrule of the male optical connector (not shown in the figure) when mated with the female optical connector 100, and a spring flap 113 to couple the wipe panel 111 with the connector sleeve 102. The contacting surface of the wipe panel 111 comprises a pad 112 of microfiber cloth to clean the mating end face of the optical ferrule of the male optical connector. The pad 112 may be made of any other material able to trap dirt. The microfiber cloth is made from split microfiber filaments that will act as hooks to trap the dirt. In addition, the microfiber cloth may create an electrostatic charge when rubbed together that will attract contaminants to the cloth.

The spring flap 113, which is coupled at one end to the rear surface of the wipe panel 111 and at the opposite end to one of the side walls 105 of the connector sleeve 102, provides compression between the microfiber cloth and the optical ferrule of the male optical connector to ensure the microfiber cloth reaches any recess of the mating end surface of said optical ferrule. In some examples, the spring flap 113 may be formed of a resilient material such as stainless steel or similar in order to provide a biasing force to the cleaning surface, or wiping surface, of the wipe panel 111. In some examples, the spring flap 113 may be adhesively secured or welded to any of the side walls 105 of the connector sleeve 102. While the wipe panel 111 is illustrated as being substantially planar in shape, in other examples, the wipe panel 111 may instead be non-planar. A wipe panel 111 having a concave or convex curved contacting surface may improve the cleaning action when said contacting surface with the pad 112 moves across a non-planar mating end surface of a male optical connector. In some examples, the spring flap 113 may be coupled to any of the inner faces of the connector sleeve 102.

The inner surface of the bottom wall 104 of the connector sleeve 102 comprises channels 114 and the wipe panel 111 comprises protrusions 115 that engage into the channels 114. The wipe panel 111 further comprises cylindrical side edges 116 that protrude out of the wipe panel 111 such that the protruding ends of the cylindrical side edges 116 are the protrusions 115 that engage into the channels 114. There are analogous channels 114 located at the inner surface of the upper wall and analogous protrusions 115 at the upper edge of the cylindrical side edges 116 to correctly guide the wipe panel 111 avoiding blockings during its movement. The cleaning element 101 is movable along the channels 114 between a cleaning position, in which the wipe panel 111 is positioned perpendicular to the optical ferrule of the male optical connector and a resting position in which the wipe panel 111 is positioned to allow interconnection of the optical ferrules of the male and female optical connectors. The spring flap 113 allows the cleaning element 101 to return to its resting position once the male optical connector is pulled out of the connector sleeve 102 of the female optical connector 100. In FIG. 1, the wipe panel 111 is in its resting position. In other examples, there may be one single protrusion at the top edge of the wipe panel with a single corresponding channel located at the inner surface of the upper wall, a single protrusion at the lower edge of the wipe panel with a single corresponding channel located at the inner surface of the bottom wall or a combination thereof. In some other examples, there may be more than two protrusions and channels at the top edge of the wipe panel and or the lower edge of the wipe panel. The position of the wipe panel and the channels relative to the walls of the connector sleeve does not limit the scope and spirit of the present disclosure as described in the following claims.

Figure 2:
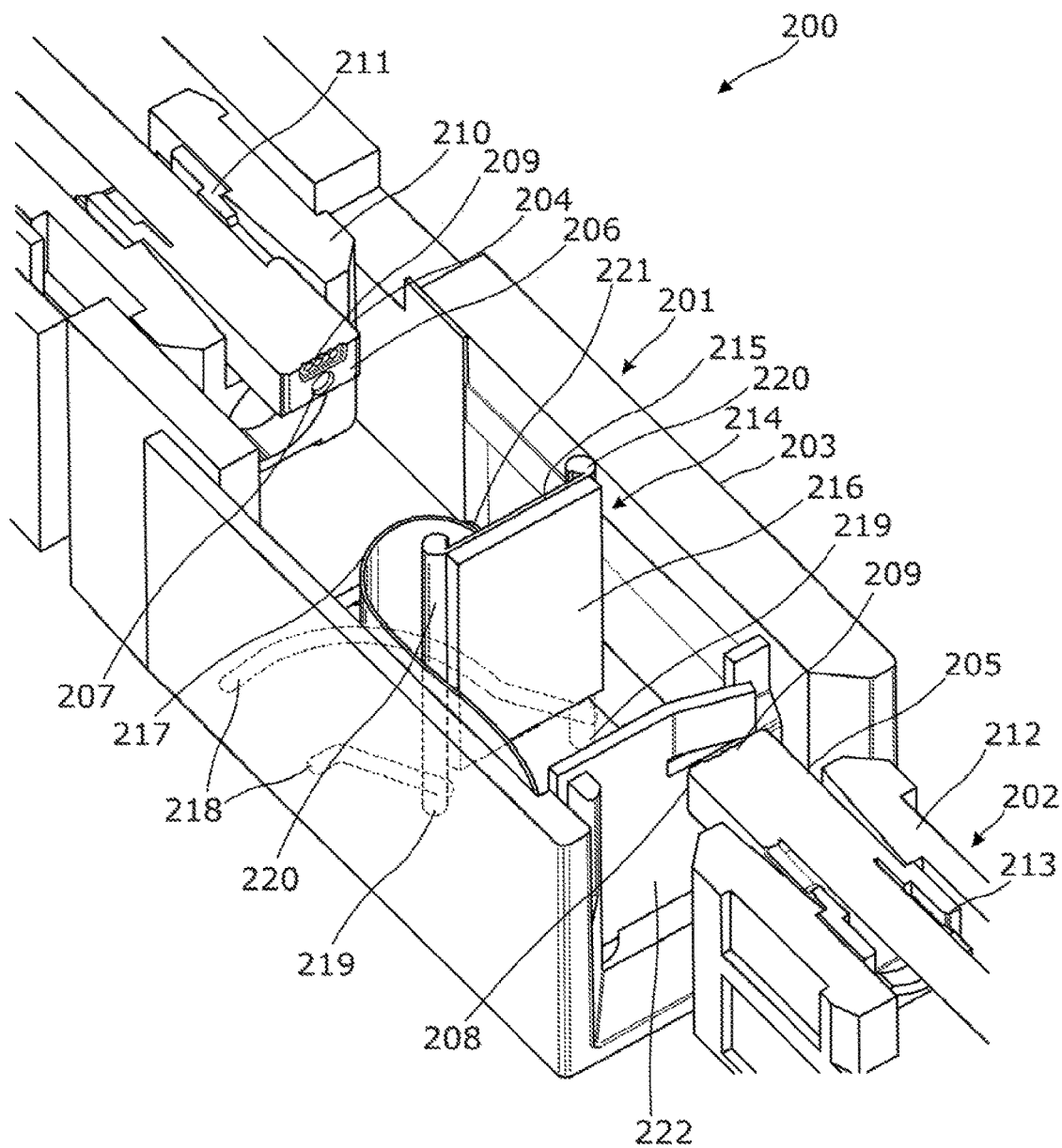
FIG. 2 illustrates a perspective view of an example connector assembly including another example optical connector with a movable cleaning element and a door, and a male optical connector.

FIG. 2 shows a perspective view of an example connector assembly 200 including another example female optical connector 201, and a male optical connector 202. More specifically, FIG. 2 shows a lower portion of the connector assembly 200, said lower portion corresponding to a longitudinal section of the connector assembly 200 along the upper surface of the shown connector assembly 200. The female optical connector 201 comprises a rectangular connector sleeve 203 and an optical ferrule 204 located at the rear of the connector sleeve 203. The connector sleeve 203 protects the optical ferrule 204 of the female optical connector 201 and help to axially align the optical ferrule 204 with the optical ferrule 205 of the male optical connector 202, so both optical ferrules 204-205 perfectly match to optimize data transmission. The optical ferrule 204 of the female optical connector 201 supports an end portion of at least one optical lens and has a mating end face 206 at which an end 207 of the optical lens is located. The optical ferrule 205 of the male optical connector 202 also supports an end portion of at least one optical lens and has a mating end face 208 at which an end (not shown in the figure) of the at least one optical lens is located. When the male and female optical connectors 201-202 are interconnected, the mating end faces 206-208 of the respective optical ferrules 204-205 will abut one another and their corresponding optical lenses will be coaxially aligned such that the ends 207 of the optical lenses will directly oppose one another. In this example, each of the mating end faces 206-208 of the optical ferrules 204-205 comprises a complementary shaped surface 209 that matches in one another to assure a correct alignment of the ends 207 of the end portions of the optical lenses.

The optical ferrules 204-205 are attached to corresponding sub-assembly bodies 201-212 by click mechanisms 211-213 or any other mechanisms that assure a strong and secure connection of the optical ferrules 204-205 to the optical cables. In turn, the connector sleeve 203 is attached to the optical ferrule 204 by interposition of the sub-assembly body 210. The end of the optical ferrule 204 of the female optical connector 201 protrudes out of the sub-assembly body 210 to mate with the optical ferrule 205 of the male optical connector 202 inside the connector sleeve 203.

The connector sleeve 203 comprises a movable cleaning element 214 having a wipe panel 215 with a cleaning surface 216, said cleaning surface 216 corresponding to the contacting surface of the wipe panel 215 with the male optical connector 202 with the microfiber pad, to clean the mating end surface 208 of the male optical connector. The wipe panel 215 may be attached to an inner face of any of the walls of the connector sleeve 203 via a spring flap 217. In this particular example the wipe panel 215 is attached to the inner face of one of the side walls of the connector sleeve 203. The cleaning surface 216 of the wipe panel 215 may comprise microfiber cloth or any other material able to trap dirt.

The inner surface of the bottom wall of the connector sleeve 203 comprises channels 218 and the wipe panel 215 comprises protrusions 219 that engage into the channels 218, so that, the cleaning element 214 is movable along the channels 218 between a cleaning position, in which the wipe panel 215 is positioned perpendicular to the optical ferrule 205 of the male optical connector 202 and a resting position in which the wipe panel 215 is laterally moved along the channels 218 being positioned to allow connection of the optical ferrules 204-205 of the male and female optical connectors 201-202. The wipe panel 215 comprises cylindrical side edges 220 that protrudes out of the wipe panel 219, such that the protruding ends of the cylindrical side edges 220 are the protrusions 219 that engage into the channels 218. In FIG. 2, the wipe panel 215 is in its resting position. In other examples, there may be a different number of channels and corresponding protrusions located in correspondence to the top edge of the wipe panel 215, the lower edge of the wipe panel 215 or a combination thereof.

In this example, the spring flap 217 is coupled at one end to one of the side walls of the connector sleeve 203. The opposite end 221 of the spring flap 217 is configured to provide a biasing force to the cleaning surface 216 by pushing the rear face of the wipe panel 215 and to freely move between the cylindrical side edges 220. The end 221 of the spring flap 217 abuts against the cylindrical side edges 220 such that the cylindrical side edges 220 limit the movement of the end 221 of the spring flap 217 along the rear face of the wipe panel 215. The end 221 of the spring flap 217 moves towards the cylindrical side edge 220 located closer to the side wall to which the spring flap is coupled when the movable cleaning element 214 is in its resting position, and moves towards the cylindrical side edge 220 located closer to the opposite side wall to which the spring flap is coupled when the movable cleaning element 214 is positioned to allow connection of the optical ferrules 204-205 of the male and female optical connectors 201-202. The spring flap 217 allows the cleaning element 214 to return to its resting position once the male optical connector 202 is pulled out of the connector sleeve 203 of the female optical connector 201.

In other examples, the wipe panel 215 may be non-planar, i.e., it may have a concave or convex curved cleaning surface 216 or any other shape that may fit the geometry of the mating end surface 208 of the optical ferrule 205 of the male optical connector 202.

The connector sleeve 203 comprises a door 222 at its opening to shield the optical ferrule 204 of the female optical connector 201 from dirt. The door 222 is pivotally attached to one of the inner faces of the connector sleeve 203. In this example, the door 222 is pivotally coupled to the same side wall to which the spring flap 217 is coupled.

In other examples, there may be a different number of channels 218 and corresponding protrusions 219 at the top edge and/or the lower edge of the wipe panel 215. The position of the wipe panel and the channels relative to the walls of the connector sleeve does not limit the scope and spirit of the present disclosure as described in the following claims.

Figure 3:
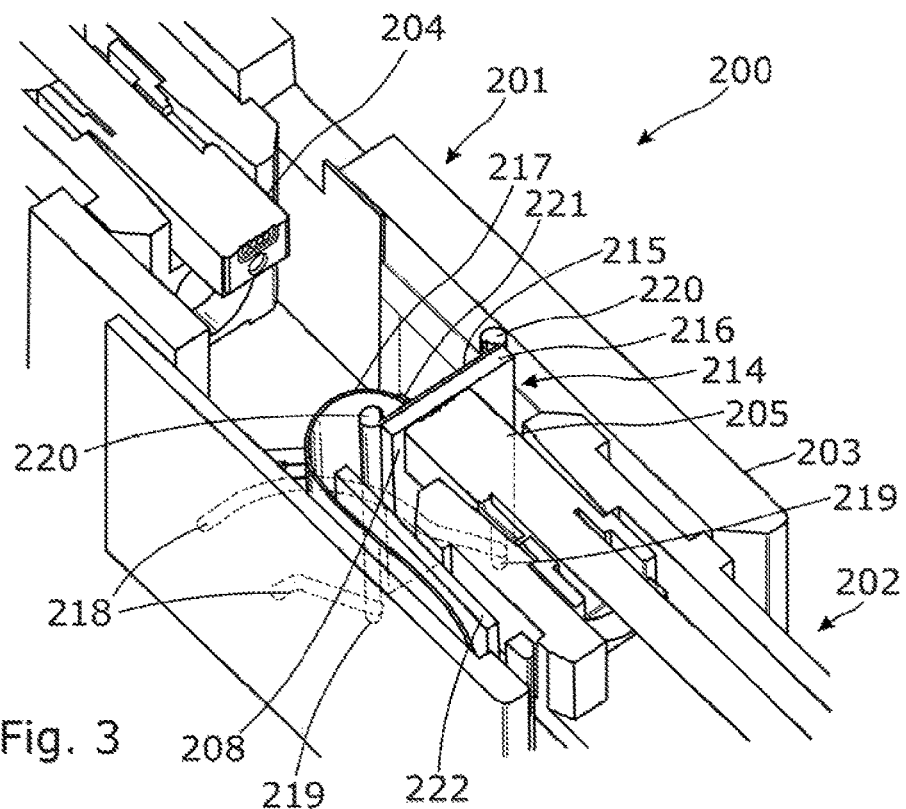
FIG. 3 illustrates a perspective view of the example connector assembly of FIG. 2 in which the male optical connector has been partially inserted into the connector sleeve of the example optical connector and wherein the optical ferrule of the male optical connector is contacting the wipe panel of the movable cleaning element of the example optical connector.
Figure 4:
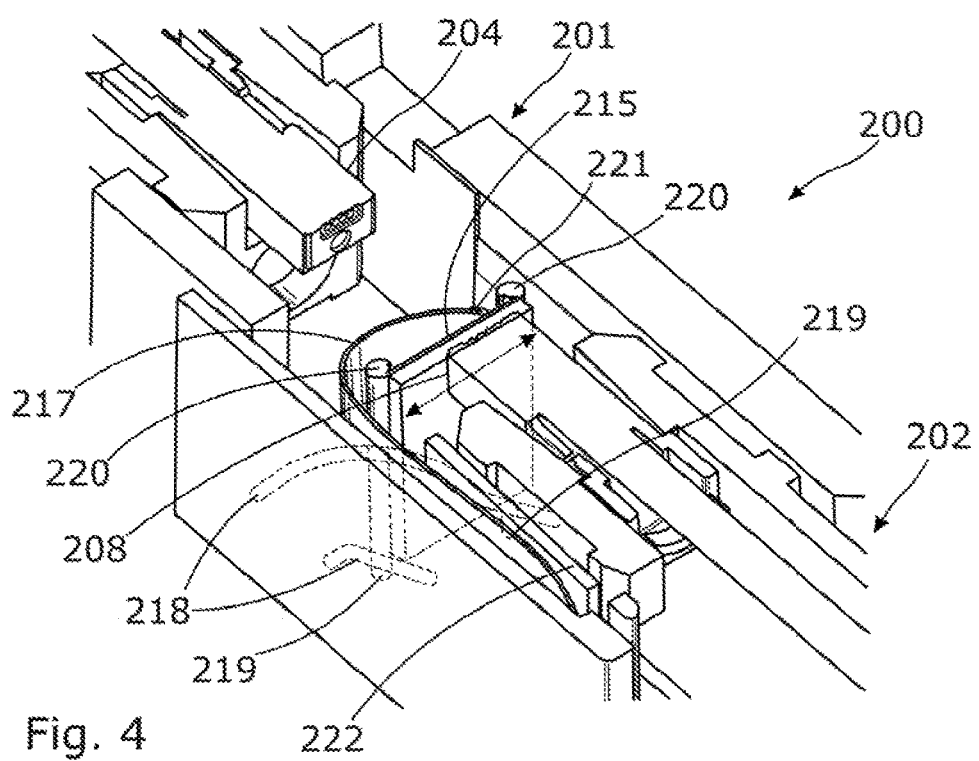
FIG. 4 illustrates another perspective view of the example connector assembly of FIG. 2 wherein the optical ferrule of the male optical connector is pushing the wipe panel of the movable cleaning element of the example optical connector.

FIG. 3 and FIG. 4 show the connector assembly 200 of FIG. 2 with the male optical connector 202 partially inserted into the connector sleeve 203 at two different stages of the connection process. Said FIGS. 3 and 4 provide an illustration of how the movable cleaning element 214 cleans the mating end surface 208 of the male optical connector 202. More specifically, FIG. 3 illustrates a perspective view of the example connector assembly of FIG. 2 in which the male optical connector 202 has been partially inserted into the connector sleeve 203 of the female optical connector 201 such that the mating end surface 208 of the optical ferrule 205 of the male optical connector 202 is contacting the fiber cloth of the wipe panel 215. As the male optical connector 202 is inserted into the connector sleeve 203, the door 222 is pushed open and contact is made with the fiber cloth. In FIG. 3, the wipe panel 215 is in its resting position. In FIG. 4, the optical ferrule 205 of the male optical connector 202 is pushing the wipe panel 215 of the movable cleaning element 214. As the optical ferrule 205 continues to be inserted the fiber cloth wipes across the mating end surface 208 of the optical ferrule 205 and then rotates out of the way of the optical ferrule 205 to allow a connection. The fiber cloth of the wipe panel 215 moves in a perpendicular direction relative to the male optical connector 202 displacement direction such that, the microfiber filaments can trap the dirt. Comparing FIGS. 3 and 4, it can be seen how the introduction of the male optical connector 202 has advanced and how the end 221 of the spring flap 217 has moved towards the cylindrical side edge 220 located closer to the opposite side wall to which the spring flap 217 is coupled. It can be seen in FIG. 4 how the spring flap 217 is slightly compressed providing a biasing force to hold the fiber cloth of the wipe panel 215 and mating end surface 208 of the optical ferrule 205 in good contact with each other. It can also be seen from FIG. 3 and FIG. 4, how the door 222 has been pushed out of the way by the male optical connector 202 remaining retained in an existing space between the side wall to which the door 222 is pivotally attached and the male optical 202 connector itself. In FIG. 4, the wipe panel 215 is in an intermediate position so that the protrusions 219 of the wipe panel 215 have partially moved through the channels 218.

Figure 5:
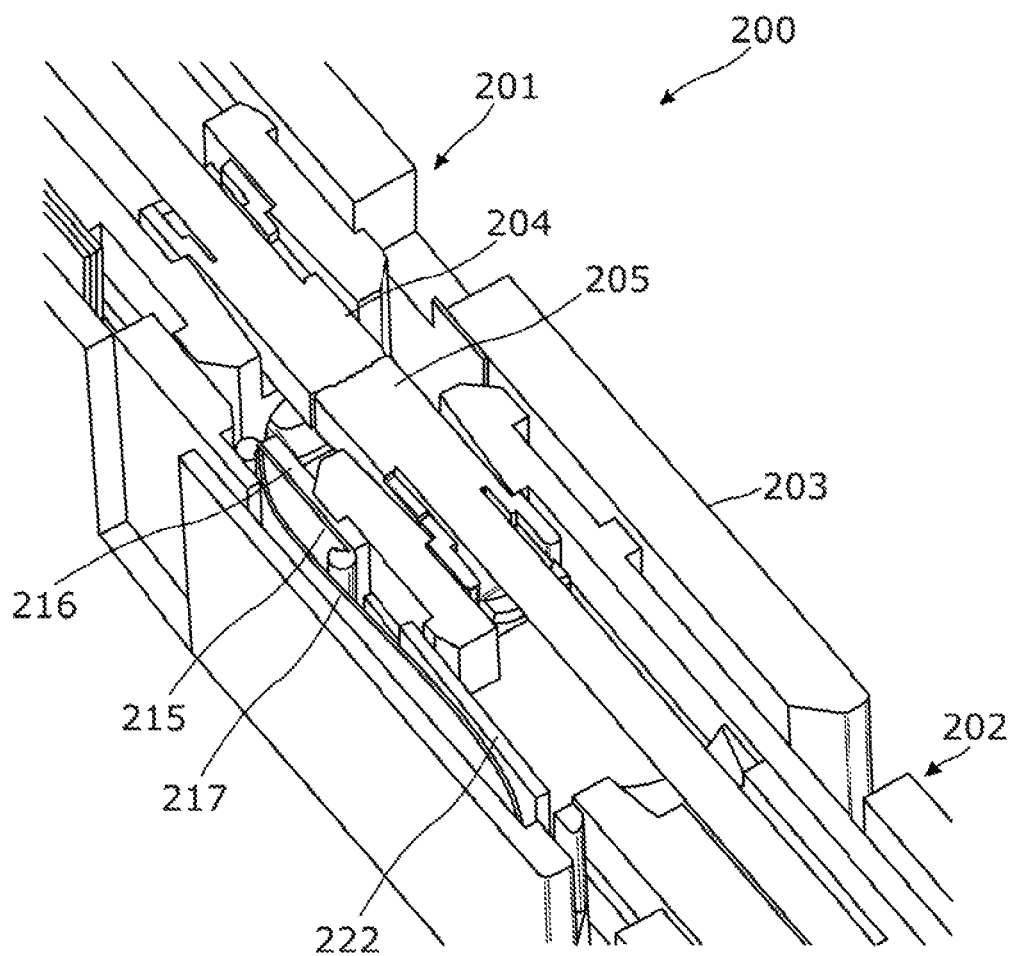
FIG. 5 illustrates another perspective view of the connector assembly of FIG. 2 wherein the male optical connector has been fully inserted into the connector sleeve of the example optical connector such that the optical ferrule of the male optical connector and the optical ferrule of the example optical connector are contacting to each other.

FIG. 5 illustrates an example perspective view of the connector assembly 200 of FIG. 2 wherein the male optical connector 202 has been fully inserted into the connector sleeve 203 of the female optical connector such that the optical ferrule 205 of the male optical connector 202 and the optical ferrule 204 of the female optical connector 201 are in contact allowing the optical communication between the optical ferrules 204-205 of the male and female optical connectors 201-202. It can be seen that the door 222 has been pushed out of the way by the male optical connector 202 remaining retained in an existing space between the side wall to which the door 222 is pivotally attached and the male optical 202 connector itself. It can also be seen that the spring flap 217 is fully compressed remaining retained in an existing space between the side wall to which the door 222 is pivotally attached and the male optical 202 connector itself. In FIG. 5, the protrusions 219 of the wipe panel 215 have moved through the channels 218 until the movable cleaning element 214 is positioned to allow connection of the optical ferrules 204-205 of the male and female optical connectors 201-202.

Figure 6:
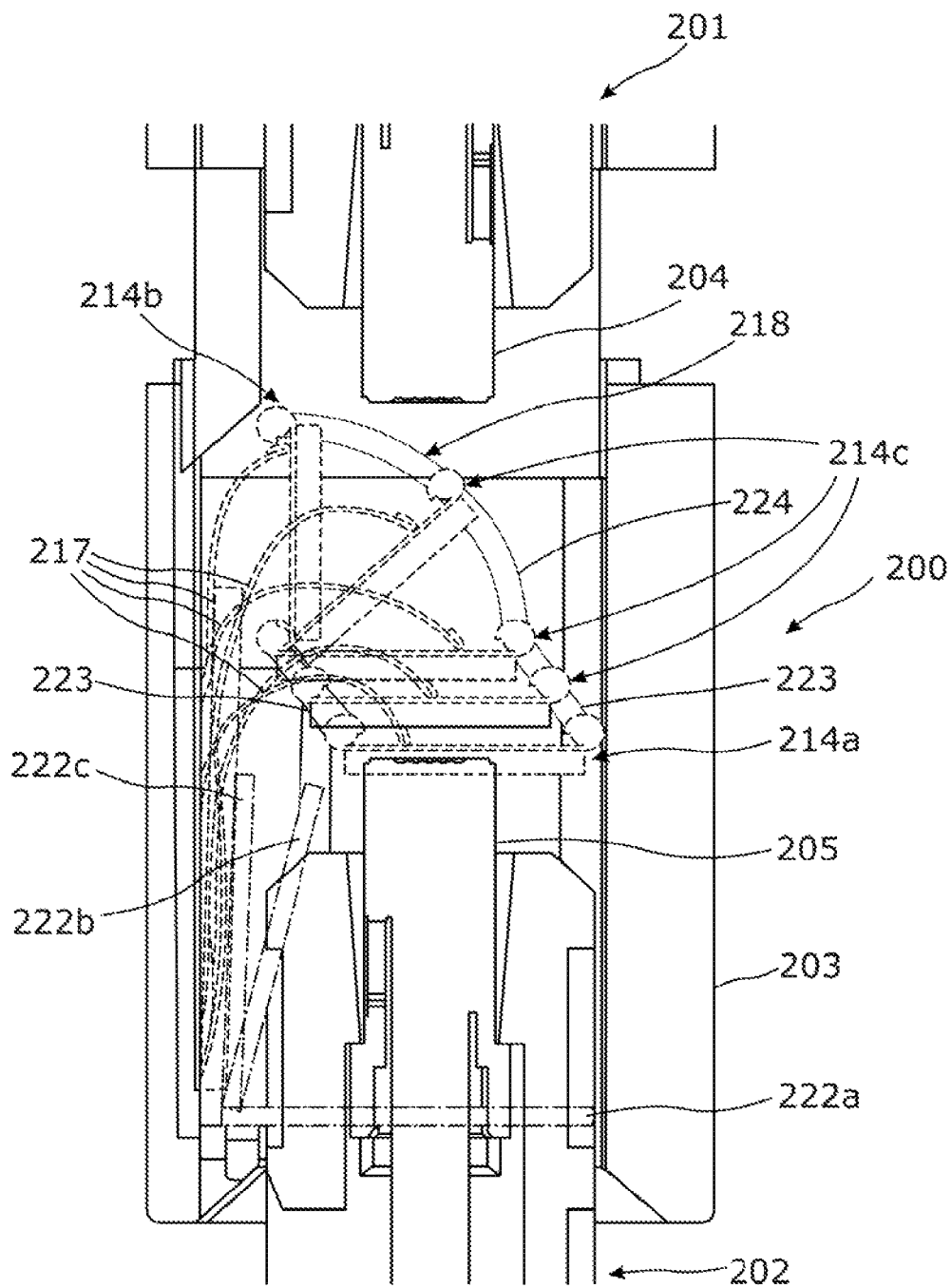
FIG. 6 illustrates a top view of the connector assembly of FIG. 2 in which the male optical connector has been partially inserted into the connector sleeve of the example optical connector and wherein the cleaning element moves along the channels defining an initial position, a final position and several intermediate positions.

FIG. 6 illustrates an example of a top view of the connector assembly 200 of FIG. 2 in which the male optical connector 205 has been partially inserted into the connector sleeve 203 of the female optical connector 201 and wherein the movable cleaning element 214 moves along the channels 218 defining an initial position 214*a*, a final position 214*b* and three intermediate positions 214*c*. The cleaning element 214 is shown in dotted lines. The initial position 214*a* of the cleaning element 214 corresponds to the resting position of the cleaning element 214 in which the optical ferrule 205 of the male optical connector 202 has just contacted the fiber cloth of the wipe panel 215. The final position 214*b* of the cleaning element 214 corresponds to the position that allows connection of the optical ferrules 204-205 of the male and female optical connectors 201-202. The intermediate positions 214*c* correspond to different positions of the cleaning element 214 during its movement through the channels 218. The door 222 of the female optical connector 201 is shown in dotted lines in 3 different positions; a first position 222*a* in which the door 222 is closed shielding the optical ferrule 204 of the female optical connector 201 from dirt, a second position 222*b* in which the door 222 has not been completely opened and a third position 222*c* in which the door 222 is completely opened abutting against the spring flap 217.

Each channel 218 comprises a first section 223 that guides the protrusions 219 of the wipe panel towards the side wall to which the spring flap 217 is coupled. The first sections 223 of the channels 218 are parallel to each other. In some examples, the first sections 223 completely guide the protrusion 219 located closer to the wall of the connector sleeve 203 to which the spring flap 217 is coupled and partially guide the protrusion 219 located closer to the opposite wall to which the spring flap 217 is coupled. Those channels located closer to the opposite wall to which the spring flap 217 is coupled further comprise a second section 224 that guides the corresponding protrusion 219 of the wipe panel 215 towards the wall to which spring flap 217 is coupled. According to the figures, the first section 223 may be substantially straight while the second section 224 may be substantially curved. In other examples, the channels 218 may have any geometry that allows the cleaning element 214 to define a perpendicular positioning of the wipe panel relative to the optical ferrule 205 of the male optical connector 202 and a positioning that allows connection of the optical ferrules 204-205 of the male and female optical connectors 201-202. In other examples, the first sections 223 may partially guide all the protrusions 219 of the wipe panel 215 and each one of the first sections 223 may comprise a second section 224 to guide the corresponding protrusions 219 of the wipe panel 215 towards the wall to which spring flap 217 is coupled, up to the position that allows connection of the optical ferrules 204-205 of the male and female optical connectors 201-202. In these examples, the second section 224 of the channels 218 located closer to the wall of the connector sleeve 203 to which the spring flap 217 is coupled would be substantially straight and significantly shorter that the second section 224 of the channels 218 located closer to the opposite wall to which the spring flap 217 is coupled. In other examples, the pair of channels 218 formed on each opposing inner surface of the connector sleeve are separated from each other a distance substantially equal to the width of the wipe panel 215.

The first sections 223 of the channels 218 are configured such that the wipe panel 215 moves in a perpendicular direction relative to the optical ferrule 205 displacement direction while the wipe panel 215 traverses said first sections 223. In this way, the microfiber filaments of the fiber cloth can trap dirt from the mating end face 208 of the optical ferrule 205. The second sections 224 of the channels 218 are configured such that the optical ferrule 205 pushes the wipe panel 215 out of the way while the wipe panel 215 traverses the second sections 224. The second sections 224 delimit the position of the movable cleaning element 214 to allow connection of the optical ferrules 204-205 of the male and female optical connectors 201-202.

Figure 7A:
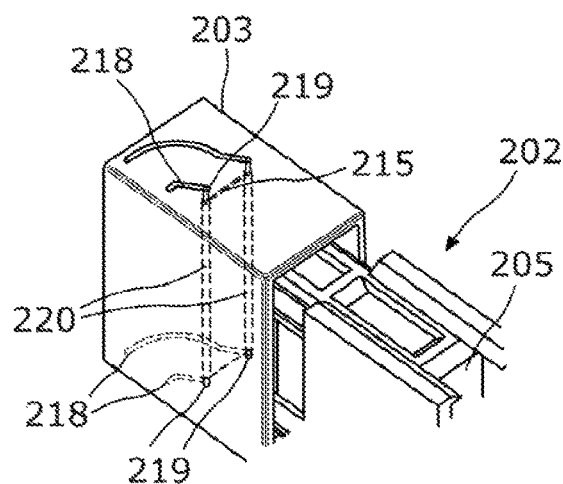
FIGS. 7a-c illustrate respective perspective views of the example connector assembly of FIG. 2 in which the male optical connector has been inserted into the connector sleeve of the example optical connector and where the wipe panel is located in an initial position (a), a final position (c) and in an intermediate position (b).
Figure 7B:
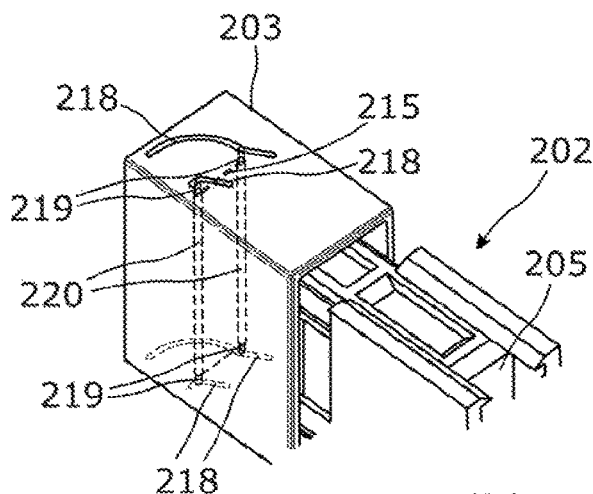
Figure 7C:
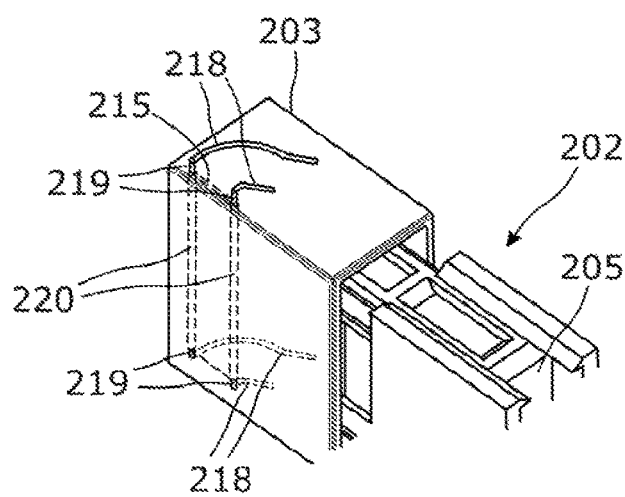

FIGS. 7*a-c* illustrate respective perspective views of the example connector assembly of FIG. 2 in which the male optical connector 202 has been inserted into the connector sleeve 203 of the example optical connector and where the wipe panel 215 is located in its initial position (a), its final position (c) and in an intermediate position (b). In this example, 2 channels 218 located in the inner surface of the bottom wall of the connector sleeve 203 and two channels 218 located in the inner surface of the upper wall of the connector sleeve 203 are shown. The channels of the upper and lower walls of the connector sleeve 203 are located in correspondence to each other. The wipe panel 215 comprise two cylindrical side edges 220 with protrusions 219 at their ends that engage into the channels. The movement of the protrusions 219 along the channels 218 defines the initial, the intermediate and final position of the wipe panel 215.

The solution herein described present many advantages, including that optical connectors will have to be cleaned less often if at all and eliminate potential failures in the field due to dirt inclusions impacting optical signal integrity.

What is claimed is:

1. An apparatus comprising:
a female optical connector comprising a connector sleeve and an optical ferrule located at a rear of the connector sleeve;
a cleaning element located within the connector sleeve, wherein the cleaning element comprises a wipe panel to clean an end of an optical ferrule of a male optical connector when mated with the female optical connector and a spring flap to couple the wipe panel to the connector sleeve;
wherein the connector sleeve comprises channels and the wipe panel comprises protrusions that engage into the channels such that the wipe panel is movable along the channels between a cleaning position in which the wipe panel is positioned perpendicular to the optical ferrule of the male optical connector and a resting position in which the wipe panel is positioned to allow connection of the optical ferrules of the male and female optical connectors.

2. The apparatus of claim 1, comprising a door pivotally coupled to the opening of the connector sleeve to shield the female optical connector from dirt.

3. The apparatus of claim 1, wherein the wipe panel comprises a pad made of microfiber cloth located in a contacting surface of the wipe panel with the optical ferrule of the male optical connector.

4. The apparatus of claim 1, wherein the channels are formed on inner surfaces of walls of the connector sleeve.

5. The apparatus of claim 4, wherein the wipe panel comprises at least one protrusion to engage in each one of the channels.

6. The apparatus of claim 5, wherein the protrusions are located at the corners of the wipe panel and in correspondence with the channels.

7. The apparatus of claim 5 wherein the wipe panel comprises cylindrical side edges located on side edges of the wipe panel, such that the protrusions correspond to ends of the cylindrical side edges that protrudes out of the wipe panel.

8. The apparatus of claim 1, wherein the spring flap is made of a resilient material.

9. The apparatus of claim 7, wherein the spring flap is made of steel.

10. The apparatus of claim 8, wherein the spring flap is coupled at one end to a rear surface of the wipe panel and at an opposite end to an inner surface of the connector sleeve.

11. The apparatus of claim 1, wherein the channels have a geometry to guide the wipe panel in a direction towards an inner surface of the connector sleeve.

12. The apparatus of claim 11, wherein the geometry of the channels comprise a first section and a second section, the first section being substantially straight in a direction towards one of the walls of the connector sleeve and the second section, connected to the first section, being substantially curved in a direction towards the same wall of the connector sleeve.

13. The apparatus of claim 12, wherein the first sections are to guide the wipe panel in a perpendicular direction relative to the male optical connector displacement direction while the wipe panel traverses said first sections, and the second sections are to guide the wipe panel out of the way while the wipe panel traverses the second sections.

14. An apparatus comprising:
a female optical connector comprising a connector sleeve and an optical ferrule located at a rear of the connector sleeve;
a cleaning element located within the connector sleeve, wherein the cleaning element comprises a wipe panel and a spring flap, the spring flap being coupled at one end to the wipe panel and at the opposite end to the connector sleeve; and
wherein the connector sleeve comprises a pair of channels formed on opposing inner surfaces, and the wipe panel comprises a wiping surface and protrusions, wherein each one of the protrusions engage into each one of the channels.

15. The apparatus of claim 14, wherein the connector sleeve comprises a first pair of channels formed on a bottom inner surface and a corresponding second pair of channels formed on an upper inner surface.

16. The apparatus of claim 14, wherein each pair of channels comprises an inner channel located in proximity to a wall of the connector sleeve to which the spring flap is coupled and an outer channel located in proximity to an opposite wall to which the spring flap is coupled.

17. The apparatus of claim 16, wherein the inner channel and the outer channel comprise a first section being substantially straight in a direction towards the wall of the connector sleeve to which the spring flap is coupled and the outer channel comprises a second section connected to the first section, being substantially curved in a direction towards the same wall.

18. The apparatus of claim 17, wherein the inner channel comprises a second section connected to the first section being substantially straight in a direction towards the wall of the connector sleeve to which the spring flap is coupled.

19. The apparatus of claim 14, wherein the pair of channels formed on each opposing inner surface of the connector sleeve are separated from each other a distance equal to a width of the wipe panel.

20. A connector assembly, comprising an apparatus as described in claim 1 and a male optical connector comprising a male optical ferrule,
wherein the male optical connector is to connect with the female optical connector by inserting the male optical ferrule in the connector sleeve of the female optical connector.

* * * * *